US012246545B2

(12) United States Patent
Breton et al.

(10) Patent No.: US 12,246,545 B2
(45) Date of Patent: Mar. 11, 2025

(54) DOCKING STATION

(71) Applicant: COLOP Digital GmbH, Wels (AT)

(72) Inventors: Alex Breton, Enskede Gard (SE); Franz Völkl, Wels (AT)

(73) Assignee: COLOP DIGITAL GMBH, Wels (AT)

( * ) Notice: Subject to any disclaimer, the term of this patent is extended or adjusted under 35 U.S.C. 154(b) by 855 days.

(21) Appl. No.: 17/254,041

(22) PCT Filed: Jun. 25, 2019

(86) PCT No.: PCT/EP2019/066829

§ 371 (c)(1),
(2) Date: Dec. 18, 2020

(87) PCT Pub. No.: WO2020/002328

PCT Pub. Date: Jan. 2, 2020

(65) Prior Publication Data

US 2021/0271292 A1 Sep. 2, 2021

(30) Foreign Application Priority Data

Jun. 25, 2018 (EP) .................................... 18179487

(51) Int. Cl.
*B41J 3/36* (2006.01)
*B41J 2/165* (2006.01)
*B41K 1/36* (2006.01)

(52) U.S. Cl.
CPC ............. *B41J 3/36* (2013.01); *B41J 2/16508* (2013.01); *B41J 2/16538* (2013.01); *B41J 2/16547* (2013.01); *B41K 1/36* (2013.01)

(58) Field of Classification Search
CPC .......................................................... B41J 3/36
See application file for complete search history.

(56) References Cited

U.S. PATENT DOCUMENTS 5,812,157 A 9/1998 Nguyen et al.
6,312,124 B1 11/2001 Desormeaux
7,500,732 B2 3/2009 James et al.
(Continued)

FOREIGN PATENT DOCUMENTS

CN 2275519 Y 3/1998
CN 1693081 A 11/2005
(Continued)

OTHER PUBLICATIONS

Office Action and Search Report for Russian Patent Application No. 2021101270/28(002464) (Oct. 5, 2022).
(Continued)

*Primary Examiner* — Shelby L Fidler
(74) *Attorney, Agent, or Firm* — Merchant & Gould P.C.

(57) ABSTRACT

A docking station (1) is for an electronic hand stamp having an inkjet printhead. The docking station (1) includes a body (2) having a rest surface (4) for receiving a substantially flat bottom side of an electronic hand stamp and a border (5) at least partially framing the rest surface (4). The docking station (1) also includes at least one wiper element (3) connected to the body (2) and that projects on one side from the body (2). The wiper element (3) includes a wiper blade (17) for manually sweeping across an inkjet printhead.

18 Claims, 5 Drawing Sheets

(56) References Cited

U.S. PATENT DOCUMENTS

| | | | | |
|---|---|---|---|---|
| 2002/0140766 | A1* | 10/2002 | Niederhausern | B41J 2/16541 347/33 |
| 2005/0053628 | A1 | 3/2005 | Montanari et al. | |
| 2007/0076045 | A1* | 4/2007 | James | B41J 2/16547 347/29 |
| 2008/0069620 | A1 | 3/2008 | Anderson et al. | |
| 2011/0162673 | A1 | 7/2011 | Samain et al. | |
| 2015/0144015 | A1* | 5/2015 | Faber | B41J 2/16547 101/333 |
| 2016/0236493 | A1 | 8/2016 | Lyman et al. | |
| 2017/0157933 | A1* | 6/2017 | Vernon | B41J 25/34 |
| 2017/0157962 | A1 | 6/2017 | Rabe et al. | |
| 2020/0171831 | A1* | 6/2020 | Lee | B41J 3/407 |
| 2021/0162762 | A1* | 6/2021 | Okeguchi | B41J 2/16544 |

FOREIGN PATENT DOCUMENTS

| | | | |
|---|---|---|---|
| JP | 2001-179999 | A | 7/2001 |
| JP | 2002-361897 | A | 12/2002 |
| JP | 2019-500207 | A | 1/2019 |
| WO | 02/09054 | A2 | 1/2002 |
| WO | 2017/100147 | A1 | 6/2017 |

OTHER PUBLICATIONS

International Search Report and Written Opinion of the International Searching Authority for International Patent Application No. PCT/EP2019/066829 mailed Aug. 16, 2019, 11 pages.

Extended European Search Report for European Patent Application No. 18179487.6 mailed Dec. 20, 2018, 10 pages.

Chinese Office Action for Chinese Patent Application No. 201980040078.7 mailed Sep. 28, 2021, 16 pages.

Office Action for Japanese Patent Application No. 2020-570900 (Dec. 27, 2022).

Second Office Action for Chinese Patent Application No. 201980040078.7 mailed Jul. 5, 2022, 9 pages.

* cited by examiner

DOCKING STATION

This application is a National Stage Application of PCT/EP2019/066829, filed 25 Jun. 2019, which claims benefit of European Patent Application Serial No. 18179487.6, filed 25 Jun. 2018, and which applications are incorporated herein by reference. To the extent appropriate, a claim of priority is made to each of the above-disclosed applications.

BACKGROUND OF THE INVENTION

The invention concerns a docking station for an electronic hand stamp having an inkjet printhead, the docking station comprising a body having a rest surface for receiving a substantially flat bottom side of an electronic hand stamp and a border at least partially framing the rest surface.

SUMMARY OF THE INVENTION

It is known in connection with inkjet printheads, that drying on the printheads nozzles can lead to printing problems.

In particular with respect to a mobile or portable application such as an electronic hand stamp, the necessity to clean and protect the printhead has been recognised. In order to achieve those, U.S. Pat. No. 6,312,124 B1 discloses a service station for a portable handheld inkjet printing system. The service station forms a receptacle that is large enough to receive and grip the chassis printhead housing. The service station comprises a motor which moves various servicing components, such as wipers and caps into place to service the printheads.

U.S. Pat. No. 7,500,732 B2 discloses a docking station comprising a housing operable to receive and releasably secure a handheld printer, and a freeing mechanism, wherein the freeing mechanism is operable to release the handheld printer from the housing.

US 2017/0157962 A1 discloses a service station for servicing a handheld jet dispensing apparatus including a fluid jet cartridge carrying a composition and a camera for capturing an image of a surface, and a body having a docking portion that is sized to receive the jet dispensing apparatus.

In US 2016/0236493 A1, a cradle including a cradle body configured to support a printing device is shown, the cradle body defining an extended battery cavity, and a communication port extending from the cradle body.

US 2008/0069620 A1 discloses an imaging apparatus including a hand-operated printer and a printer dock configured to facilitate an auxiliary print mode, e.g., the printing of envelopes, when hand-operated printer is mounted to the printer dock, in addition to a primary print mode facilitated by hand-operated printer when the hand-operated printer is separated from the printer dock.

It is an object of the present invention, to provide a more cost-effective docking station.

The invention proposes a docking station of the kind stated in the outset, comprising at least one wiper element that is connected to the body and that projects on one side from the body and comprises a wiper blade for manually sweeping across an inkjet printhead. In particular the wiper element is arranged external to a receptacle formed by the border and rest surface. The wiper element allows for manually cleaning the printhead by dislodging ink clumps attached to the printhead and blocking its nozzles and/or by evenly spreading previously applied moisture across the printhead, e.g. from a spitting routine. No motor of the docking station is required to perform the cleaning procedure. Overall, the number of parts required for assembling the docking station, and in particular the number of relatively expensive components such as a motor, is reduced compared to the prior art. At the same time, the wiper is integrated with the docking station and readily available for performing a spitting and wiping routine.

The term "docking station" means, that the device provides a receptacle for receiving (parts of) an electronic hand stamp. In itself this term does not necessarily imply, that any specific connections between the docking station and the electronic hand stamp are established, apart from mechanical contact between the two. An electronic hand stamp may have a substantially flat bottom side, which is arranged to be placed on a substrate or printing area while operating the electronic hand stamp. In this operation position, the inkjet printhead of the electronic hand stamp when moved across the print area creates a stamp imprint in the form of a printed image. In order to form said receptacle, one face of the docking station comprises a rest surface defined and limited by the border.

The invention also proposes a method for cleaning an inkjet printhead of an electronic hand stamp with a docking station as described above, the method comprising: detecting, when the electronic hand stamp is removed from the docking station; upon such detection, triggering a spitting routine of the inkjet printhead after a spitting delay. The spitting delay may be within a spitting time frame after the electronic hand stamp is removed from the docking station. The spitting time frame is chosen such that the ink is sprayed into the air and does not soil the printing substrate. The spitting delay can be between 100 ms and 500 ms, preferably between 200 ms and 400 ms.

Advantageously, the wiper element is supported moveable (or displaceable) relative to the body, in particular the wiper element is retractable in the body. In this case, the wiper element can be displaced between an extended or operation position and a to retracted or storage position, wherein the wiper element is preferably fully received inside the body in said retracted or storage position. For example, the wiper element in the extended or operation position projects on one side from the body and in the retracted our storage position is fully retracted through a slit in said one side of the body. In the retracted or storage position, the wiper element and in particular a wiper blade is protected against physical damage. In addition, ink residues deposited on the wiper blade during a wiping use are enclosed by the body, thus preventing staining a user or environment of the docking station.

In particular, the wiper element may be moveable essentially parallel to the rest surface and between a retracted (or storage) position and an extended (or operation) position, wherein the wiper element can be engaged in the retracted position or in the extended position. By the engagement, accidental movement of the wiper element between the two positions can be prevented. Specifically, it can be avoided, that the wiper element leaves the extended or operation position during wiping (i.e. under the pressure applied by the user between the wiper element and the printhead to be cleaned) and retracts into the body, thus eventually causing the body to scratch the printhead nozzles.

In a preferred embodiment, the docking station comprises a cap, wherein the cap is connected to the body and has an opening that is arranged within the border and essentially parallel to the rest surface of the body. The area covered by the cap is therefore smaller than the area of the rest surface. In particular, the cap and specifically the opening of the cap is dimensioned such as to cover the printhead nozzles and essentially only the printhead nozzles. In other words, the cap receives the nozzles whereas the rest surface receives the bottom side of the electronic hand stamp comprising the nozzles. By the relatively small size of the cap, the volume enclosed between the cap and the printhead is significantly smaller than the volume enclosed between the body and the bottom side of the electronic hand stamp. Consequently, the air enclosed inside back cap is quickly saturated with an ink solvent, thus preventing further drying. In connection with the present method for cleaning, the spitting delay is preferably long enough to avoid collection of ink inside the cap, in order to avoid sealing the air channels of the nozzle with ink residues collected inside the cap.

The cap can also be effective-albeit to a lesser extent-without the wiper element, namely for preventing drying out and the subsequent necessity for cleaning altogether. For uses where extended periods of inactivity of the electronic hand stamp are not an issue compared to the interval between exchanges of the printhead (e.g. as a part of an ink cartridge), the wiping may be optional. For such cases and within the scope of the invention, a docking station for an electronic hand stamp having an inkjet printhead may be provided, the docking station comprising: a body having a rest surface for receiving a substantially flat bottom side of an electronic hand stamp and a border at least partially framing the rest surface, wherein the docking station comprises a cap, wherein the cap is connected to the body and has an opening that is arranged within the border and essentially parallel to the rest surface of the body.

In connection with docking stations having a cap, it is advantageous if the cap is made of an elastomer or rubber material, preferably a thermoplastic elastomer, in particular with a shore hardness between 40 and 60 Shore A. The rubber material may be natural or synthetic rubber. Due to the material properties (elasticity), a more intimate and tight contact is achieved between an edge of the cap and a surface of the printhead adjacent to the nozzles. That achieves a relatively air tight sealing and prevents evaporation of solvent from the volume of the cap.

In a particular preferred embodiment, the cap is supported displaceable (or moveable) relative to the rest surface in a direction essentially perpendicular to the rest surface and biased relative to the rest surface in a direction outward (i.e. away) from the body, in particular spring-loaded. By this type of support, a well-defined and reproducible contact pressure between the cap and the printhead can be achieved. It can be avoided, that the contact pressure is determined only by the weight of the stamp resting on the cap.

It has turned out advantageous, if the body comprises at least one magnetic element, in particular a permanent magnet, wherein the at least one magnetic element is arranged for maintaining a corresponding magnetic element of an electronic hand stamp in contact with the rest surface by magnetic attraction between the magnetic elements. The corresponding magnetic element of the electronic hand stamp may be any element being attracted by the magnetic element of the docking station. The magnetic element in the docking station may ensure, that the docking station remains attached to the electronic hand stamp when the latter is lifted off a surface. In particular, this avoids unintentional “de-capping” of the printhead when displacing the electronic hand stamp together with the docking station. Moreover, the size and material of the magnetic element define a minimum contact pressure between the docking station and received electronic hand stamp. If combined with a display simply supported and biased cap, the magnetic element can be selected to at least counterbalance the force applied by the bias of the cap (i.e. a spring force).

In a further preferred embodiment, the body comprises a first connector and a second connector, wherein the first connector and the second connector are electrically connected, wherein the first connector is accessible from a side of the body outside of the rest surface, preferably in the form of an external plug, and wherein the second connector comprises at least two metallic contacts arranged within the border and in a plane essentially parallel to the rest surface of the body. The connectors allow for the docking station to provide an easy-to-use interface for charging or connecting to an electronic hand stamp received therein. For example, the first connector may have the form of a socket for receiving a power plug or it may be a socket for creating a power and data connection, e.g. a USB connection.

Preferably, the metallic contacts of the second connector are biased relative to the rest surface. Biasing the metallic contacts allows to define a contact pressure with corresponding contacts on the bottom side of the electronic stamp, wherein said contact pressure may be independent from the contact pressure of a cap. If the body comprises one or more magnetic elements, the arrangement of the magnetic elements can be such that electronic hand stamp is aligned with its contacts opposite the second connector.

In particular, the first connector and second connector May provide a data connection. For example, the docking station may act as a pass-through for a USB connection. This facilitates creating the USB connection and avoids the necessity of manually aligning and engaging a USB socket and plug.

According to a further preferred embodiment, the body comprises a vertical projection from the rest surface. The vertical projection may be a pin or ridge extending from the rest surface toward a bottom side of an electronic hand stamp received thereon. The vertical projection can serve as a mechanical means to interact with an open/close sensor inside the electronic hand stamp. For example, a pin may be used to break an electric contact inside the housing of the electronic hand stamp, thereby signalling the presence of and engagement with the docking station and acting as a trigger for starting a timer for measuring a de-capping time when lifting the electronic hand stamp off the docking station. Such a timer may serve as a means for notifying extended periods of exposure and potential drying of the printheads nozzles.

Moreover, an access opening may be formed in the body and in the rest surface, wherein the access opening connects the rest surface with a bottom surface of the docking station. The access opening can provide access to a bottom side of an electronic hand stamp received in said docking station from the bottom side of the docking station and through the access opening. Specifically, the access opening can be aligned with a button (e.g. power button) on the bottom side of the electronic hand stamp, thereby allowing a user to press said button (e.g. turning on or off the electronic hand stamp) without de-capping the printhead. For example, the electronic hand stamp can be switched on for configuring and programming a stamp image before it is lifted from the docking station.

In a further optional embodiment, the electronic hand stamp comprises one or more rubber feet arranged on a bottom surface of the docking station. The rubber feet prevent sliding of the docking station, e.g. when positioned on a table.

BRIEF DESCRIPTION OF THE DRAWINGS

Referring now to the drawings, wherein the figures are for purposes of illustrating the present invention and not for purposes of limiting the same, FIG. 1 schematically shows a graphical projection of a preferred embodiment of a docking station according to the invention.

DETAILED DESCRIPTION OF THE PREFERRED EMBODIMENT

Figure 1:
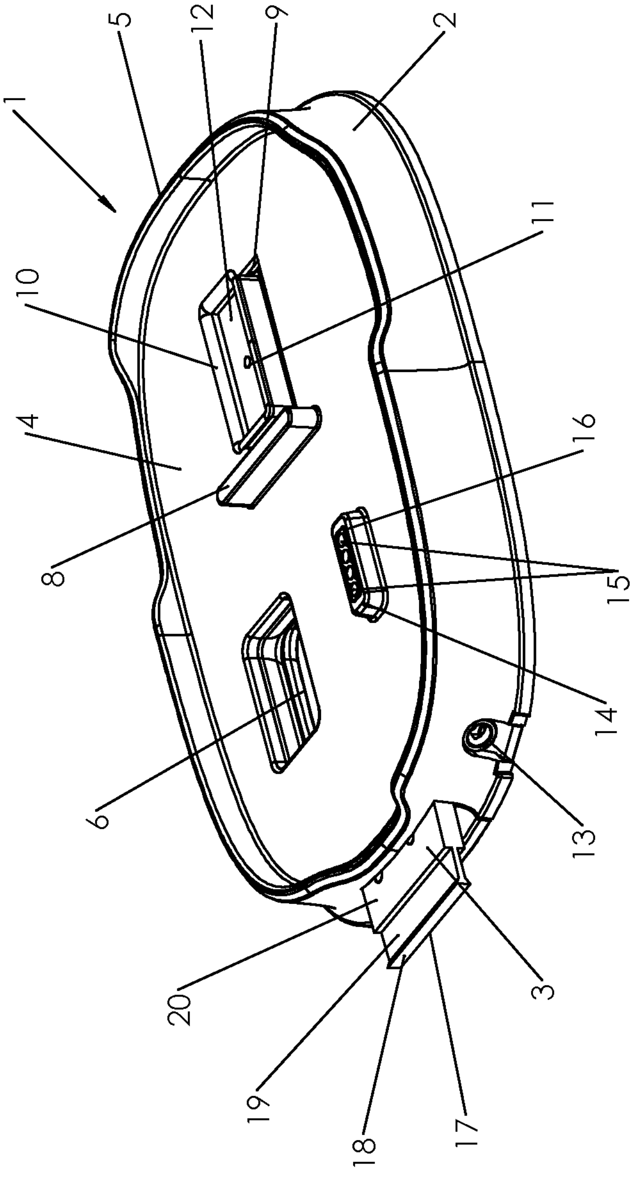

FIG. 1 shows a docking station 1 for an electronic hand stamp (not shown). The docking station 1 comprises a body 2 and a wiper element 3. The body has a rest surface 4 and a border 5. The border 5 encloses the rest surface 4, thereby framing it. In other words, border 5 defines the circumference of the rest surface 4. The height of the border 5 above the rest surface 4 may override depending on the shape of the electronic hand stamp, in particular its footprint and eventual lateral projections near its bottom side. The rest surface 4 is a substantially flat area and contribute for receiving a substantially flat bottom side of an electronic hand stamp. An access opening 6 is formed in the body 2 and in the rest surface 4. The access opening 6 connects the rest surface 4 with a bottom surface 7 (see FIG. 3) of the docking station 1. Moreover, the body comprises a vertical projection 8 from the rest surface 4. The vertical projection 8 has the form of a ridge of constant height.

Adjacent to the vertical projection 8, a recess 9 for receiving a cap 10 is provided in the rest surface 4. The cap 10 is connected to the body 2 and has an opening 11. The opening 11 is arranged within the border 5 and essentially parallel to the rest surface 4 of the body 2. The cap 10 is made of a thermoplastic elastomer preferably with a shore hardness of approximately 50 Shore A. Arranged within and enclosed by the cap 10 is a bottom cover 12. As will be apparent from FIG. 2, the cap 10 is supported displaceable or moveable relative to the rest surface 4 in a direction essentially perpendicular to the rest surface 4.

Finally, the body comprises a first connector 13 and a second connector 14. The first connector 13 and the second connector 14 are electrically connected. The first connector 13 is accessible from a side of the body 2 outside of the rest surface 4. In the present embodiment, the first connector 13 is a socket for receiving a plug of a power supply cable. The second connector 14 comprises six metallic contacts 15 arranged in pairs on respective contact supports 16. The metallic contacts 15 are arranged within the border 5 and in a common plane essentially parallel to the rest surface 4 of the body 2. The metallic contacts 15 of the second connector 14 are formed by angled contact pins that buckle under a contact pressure and are therefore biased relative to the rest surface 4. In the present embodiment, the connection provided by the first and second connectors 13, 14 is a three-pole power or charging connection. As the skilled person will readily recognise, the connectors 13, 14 can be extended to provide for additional connection pins, e.g. for a data connection such as a USB connection (between 4 and 24 pins).

Figure 4:
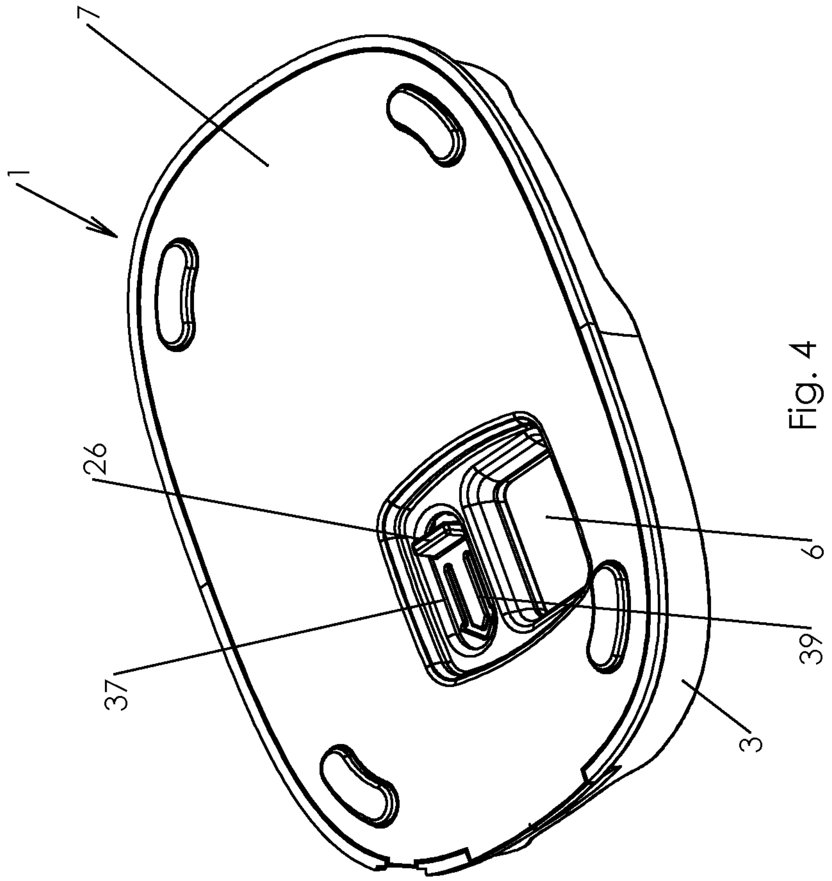
FIG. 4 schematically shows a bottom side of the docking station according to FIG. 1 with a wiper element in a retracted position.

The wiper element 3 is supported moveable essentially parallel to the rest surface relative to the body 2 and between the extended position shown in FIG. 1 and a retracted position, where the wiper element 3 is retracted in the body 2, shown in FIG. 4. The wiper element 3 comprises a wiper blade 17 defining at least one straight edge 18 for wiping a flat bottom surface of a printhead. The wiper blade 17 is supported by a thin section 19 of the wiper element 3. The thin section 19 has a decreased resiliency impact to the full-strength section 20, from which it extends. The decreased resiliency allows a user to restrict the applied pressure during a wiping routine, to avoid damaging the printhead or its nozzles.

Figure 2:
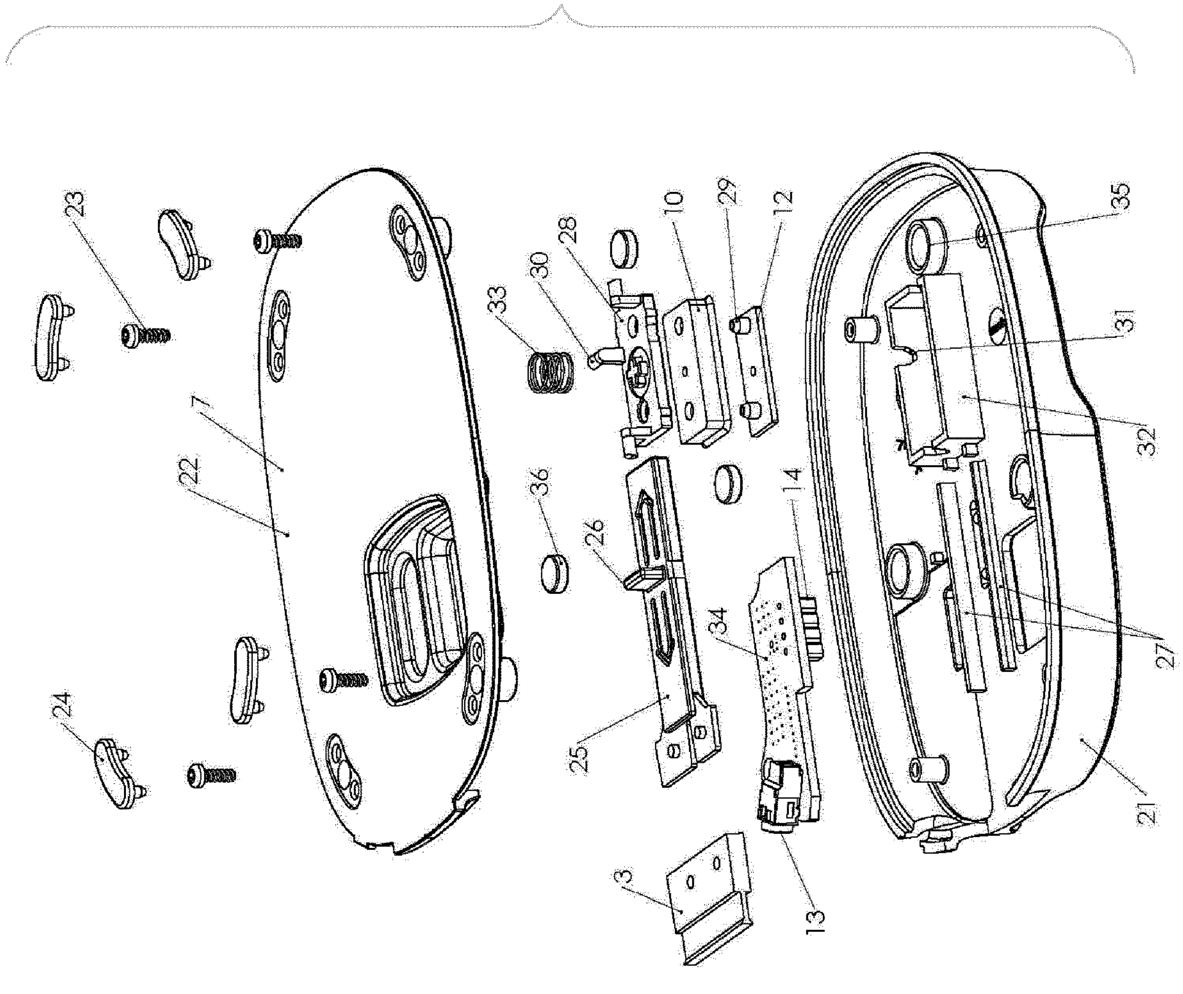
FIG. 2 schematically shows an exploded view of the docking station according to FIG. 1.

FIG. 2 shows an exploded view of the docking station 1 shown in FIG. 1. As can be seen from this exploded view, the body 2 comprises a first body part 21 and a second body part 22. The body parts 21, 22 are connected by four screws 23. In an assembled state, the screws 23 are each covered by a rubber foot 24 respectively. The wiper element 3 is supported on a slide 25 having a handle 26. The slide 25 in an assembled state is received between two guiding rails 27 formed in the first body part 21, such that it can be moved parallel to the guiding rails 27. The cap 10 is supported on a carrier 28, to which it is attached by pins 29 of the bottom cover 12, which extend through holes in the cap 10 and into the carrier 28. The carrier 28 has three lateral pins 30 received and supported in respective recesses 31 of a cap frame 32 formed in the first body part 21. A spring 33 is received between the carrier 28 and the second body part 22 in an assembled state of the docking station 1, such that the cap 10 is biased in a direction away from the second body part 22 and through the first body part 21. The first connector 13 and the second connector 14 are arranged on a printed circuit board 34 providing for the electric connections between the respective pins and integrated in the body 2. The first body part 21 further comprises three circular retainers 35, each for receiving a magnetic element 36. The magnetic elements 36 are essentially arranged around the cap 10.

Figure 3:
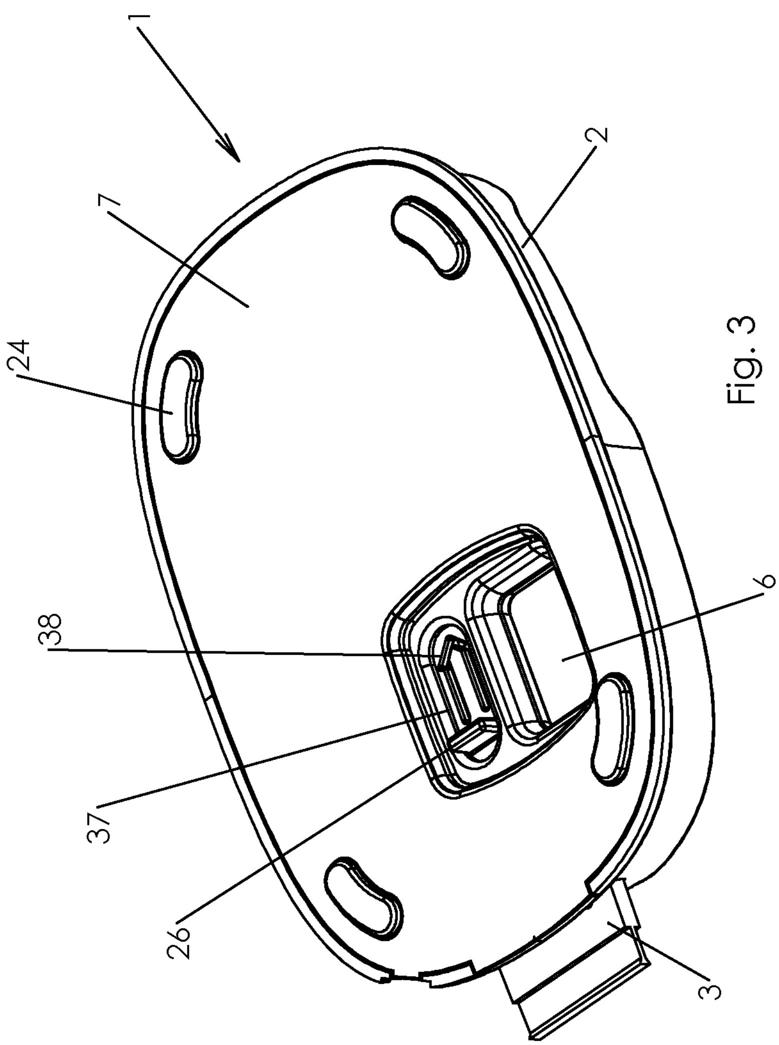
FIG. 3 schematically shows a bottom side of the docking station according to FIG. 1 with a wiper element in an extended position.

FIG. 3 shows a bottom view of the docking station 1, i.e. onto its bottom side 7. Adjacent to the access opening 6, an opening 37 is provided in the second body part 22 in order to expose the handle 26 of the slide 25 carrying the wiper element 3. In the extended position shown in FIG. 3, and arrow 38 pointing from the handle 26 into a direction opposite the wiper element 3 is visible. By moving the handle 26 in the direction indicated by the arrow 37, a user can move the wiper element from the exposed position into a retracted position.

FIG. 4 shows the result of such an operation, where the wiper element 3 is entirely retracted into the body 2. The handle 26 is now positioned on an opposite end of the opening 37. Now, and arrow 39 pointing from the handle 26 into a direction of the (retracted) wiper element 3 is visible. By pushing the handle 26 in the direction indicated by the arrow 39, a user of the docking station 1 can move the wiper element from the retracted position shown in FIG. 4 into an extended position shown in FIG. 3, thereby preparing it for a wiping routine for cleaning a printhead of an electronic hand stamp.

Figure 5:
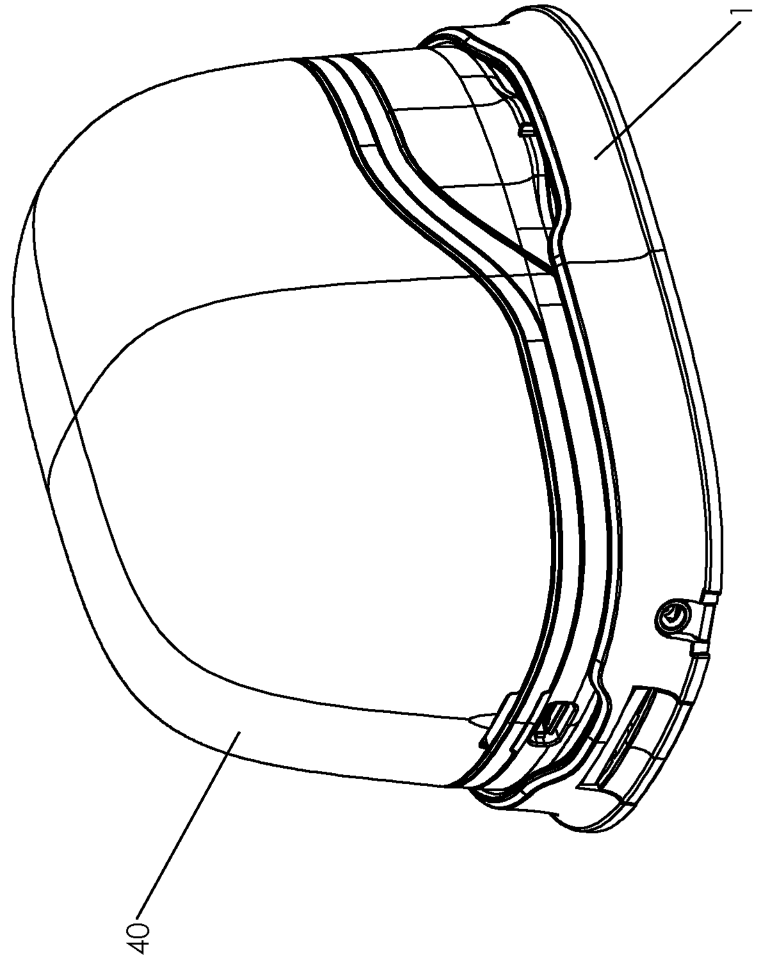
FIG. 5 schematically shows the docking station according to FIG. 1 with an electronic hand stamp received therein.

In FIG. 5 the wiper element 3 of the docking station 1 is in a retracted position. An electronic hand stamp 40 is received on the rest surface 4 with its flat bottom side resting the rest surface 4. When the electronic hand stamp 40 is lifted off the docking station 1, the vertical projection 8 is pulled from the electronic hand stamp 40, which is detected by the electronic hand stamp 40 and a spitting routine of an inkjet printhead of the electronic hand stamp 40 is triggered approximately 300 ms of spitting delay after said detection. Thereby, a tiny amount of ink is sprayed into the air above the docking station 1.

The invention claimed is:

1. A docking station for an electronic hand stamp having an inkjet printhead, the docking station comprising:

a body having a rest surface for receiving a substantially flat bottom side of an electronic hand stamp;

a border at least partially framing the rest surface; and a wiper element connected to the body, the wiper element projecting on one side from the body and comprising a wiper blade for manually sweeping across an inkjet printhead when the electronic hand stamp is detached from the docking station;

wherein the wiper element is supported moveable relative to the body; and wherein the wiper element is retractable in the body.

2. The docking station according to claim 1, wherein the wiper element is moveable substantially parallel to the rest surface between a retracted position and an extended position, wherein the wiper element is engageable in the retracted position or in the extended position.

3. The docking station according to claim 1, wherein the docking station comprises a cap, wherein the cap is connected to the body and has an opening arranged within the border and substantially parallel to the rest surface of the body.

4. The docking station according to claim 3, wherein the cap comprises an elastomer or rubber material.

5. The docking station according to claim 4, wherein the cap comprises a thermoplastic elastomer.

6. The docking station according to claim 4, wherein the elastomer or rubber material has a shore hardness between 40 and 60 Shore A.

7. The docking station according to claim 1, wherein the cap is supported displaceable relative to the rest surface in a direction substantially perpendicular to the rest surface and biased relative to the rest surface in a direction outward from the body.

8. The docking station according to claim 7, wherein the cap is spring-loaded relative to the rest surface in a direction outward from the body.

9. The docking station according to claim 1, wherein the body comprises at least one magnetic element, wherein the at least one magnetic element is arranged for maintaining a corresponding magnetic element of an electronic hand stamp in contact with the rest surface by magnetic attraction between the magnetic elements.

10. The docking station according to claim 9, wherein the at least one magnetic element is a permanent magnet.

11. The docking station according to claim 1, wherein the body comprises a first connector and a second connector, wherein the first connector and the second connector are electrically connected, wherein the first connector is accessible from a side of the body outside of the rest surface, and wherein the second connector comprises at least two metallic contacts arranged within the border and in a plane substantially parallel to the rest surface of the body.

12. The docking station according to claim 11, wherein the metallic contacts of the second connector are biased relative to the rest surface.

13. The docking station according to claim 11, wherein the first connector and the second connector provide a data connection.

14. The docking station according to claim 1, wherein the body comprises a vertical projection from the rest surface.

15. The docking station according to claim 1, wherein an access opening is formed in the body and in the rest surface, wherein the access opening connects the rest surface with a bottom surface of the docking station.

16. The docking station according to claim 1, comprising one or more rubber feet arranged on a bottom surface of the docking station.

17. A method for cleaning an inkjet printhead of an electronic hand stamp with a docking station according to claim 1, the method comprising:

detecting, when the electronic hand stamp is removed from the docking station;

upon detection, triggering a spitting routine of the inkjet printhead after a spitting delay.

18. The method according to claim 17, wherein the spitting delay is between 100 ms and 500 ms.

* * * * *